A. G. BOXELL.
FILM TREATMENT CAGE.
APPLICATION FILED JULY 19, 1919.
1,424,873.
Patented Aug. 8, 1922.
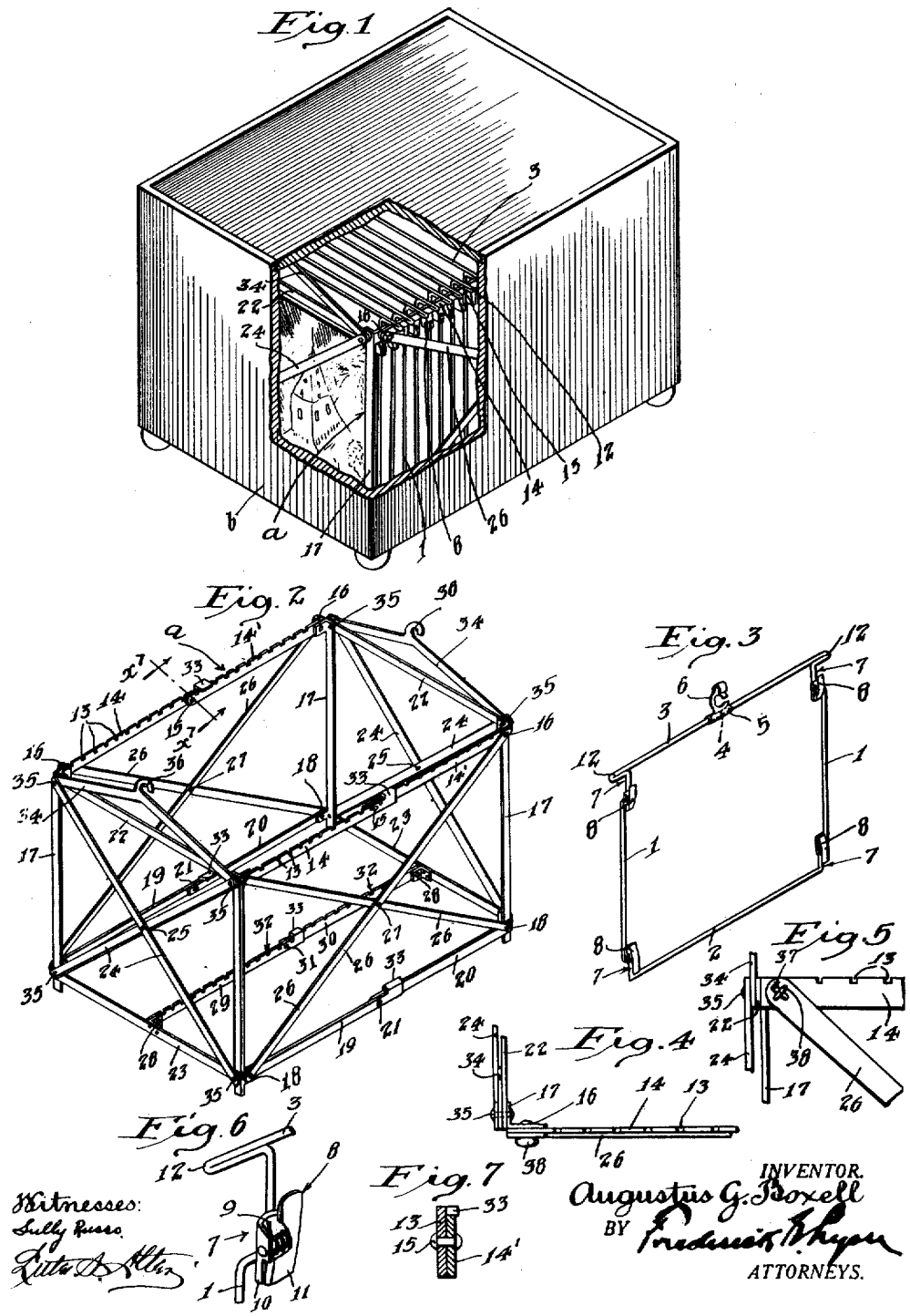
INVENTOR.
Augustus G. Boxell
BY Frederick W. Ryan
ATTORNEYS.
Witnesses:

UNITED STATES PATENT OFFICE.

AUGUSTUS G. BOXELL, OF LOS ANGELES, CALIFORNIA.

FILM-TREATMENT CAGE.

1,424,873.

Specification of Letters Patent.  Patented Aug. 8, 1922.

Application filed July 19, 1919. Serial No. 312,050.

*To all whom it may concern:*

Be it known that I, AUGUSTUS G. BOXELL, a citizen of the United States, residing at Los Angeles, in the county of Los Angeles and State of California, have invented a new and useful Film-Treatment Cage, of which the following is a specification.

This invention pertains to means for suitably supporting exposed films while they are being developed, fixed, washed and dried, and an object of the invention is to provide a device of this character in which the films can be placed and in which they can remain during the various operations incident to the converting of the exposed films into dry negatives, ready for printing.

Sheet films are rapidly coming into general use in place of glass plates in connection with cameras heretofore employing glass plates and, insofar as I am aware, no efficient means have heretofore been provided for holding such films during the performance of the various processes whereby they are converted from exposed condition to negatives ready for printing.

Another object is to construct a device of this character in which a plurality of films can be quickly placed for various treatments and from which said films can be quickly removed.

Another object is to provide a device of this character comprising separate frames on which the films can be mounted, and a rack in which the frames can be assembled with the films attached thereto, thus making it possible to treat the films simultaneously within a minimum space.

Another object is to make provision for collapsing of the rack, so that when not in use it can be folded into a comparatively small compass.

Other objects and advantages will appear in the subjoined detailed description.

The accompanying drawings illustrate the invention:

Figure 1 is a perspective view showing the invention mounted in a tray with films in place ready for treatment, a portion of the tray being broken away to expose to view portions of the invention.

Fig. 2 is a perspective view of the collapsible rack.

Fig. 3 is a perspective view of one of the frames.

Fig. 4 is an enlarged plan view of one corner of the rack.

Fig. 5 is an enlarged elevation of the left end of Fig. 4.

Fig. 6 is an enlarged perspective view of one of the film holding devices of the frame shown in Fig. 3, a portion of the clip being broken away for clearness of illustration.

Fig. 7 is a sectional elevation on line indicated by $x^7-x^7$, Fig. 2.

The films to be treated are mounted on suitable frames which are constructed as follows, the description of one sufficing for all, since they are duplicates of one another: Each frame comprises side members 1, a bottom member 2 and a top member 3. In the instance shown in the drawings, though this is not absolutely necessary, the side, bottom and top members are of integral construction, being formed from a single piece of wire and the opposite ends of the wire being brought together at 4 inside of a sleeve 5 which may be soldered or otherwise secured to said ends to hold them assembled. Thus, in this instance, the top member 3 is formed in sections. The sleeve 5 in this instance, is provided with a hook 6 so that the frame may be suspended from a line, if desired.

The frame forms inwardly bent projections 7, the lower ones being at the lower corners of the frame and the upper ones extending from the upper corners of the frame to a slight distance below the top member 3. On each of the inward projections 7 is mounted a clip 8 which may be of the ordinary construction well understood in the art pertaining to such clips. The clip spring 9, shown fragmentarily in Fig. 5, tends to hold the clip closed. The upper clips 8 are opposed to the lower clips so that the gripping jaws 10, 11 of the lower clips are turned toward the gripping jaws 10, 11 of the upper clips.

The upper member 3 is longer than the distance between the outer faces of the side members 1 so as to form lateral projections 12 adapted to engage in notches 13 of a rack indicated in general by the character *a* which will now be described. The notches 13 are formed in the upper side members of the rack, each upper side member comprising sections 14, 14' hinged together at 15 so that they may be folded together. The upper side members are pivoted at their opposite ends at 16 to uprights 17 and the lower ends of the uprights are pivoted at 18 to lower side members each comprising sections 19, 20 which are hinged together at 21 so as to be foldable alongside of one another. The uprights 17 at each end of the rack are connected to each other at their upper and lower ends by end members 22 and 23, respectively. The uprights 17 at each end are also connected with one another by braces 24, each of which extends diagonally from the upper end of one of the uprights to the lower end of the other upright, thus crossing one another near their centers where they may be fastened together by rivets 25 or the like.

The uprights 17 at one end are connected to the uprights 17 at the opposite end, at both sides of the rack, by braces 26 each of which extends diagonally from the upper end of one of the uprights to the lower end of the other upright, thus crossing one another near their centers, where they may be pivotally connected to each other by rivets 27 or the like, said rivets being sufficiently loose to permit of the braces folding alongside of one another. The braces 26 are connected at their lower ends to the uprights 17 by the pivots 18 previously described and the braces 26 are detachably connected at their upper ends to the uprights 17 by slots 37 in the braces and elongate heads 38 on the upper pivots 16. To detach the braces 26 from the upper ends of the uprights 17 the heads 38 will be turned lengthwise of the slots 37 and the braces forced outwardly from the pivots 16.

Pivoted at 28 to the lower cross members 23 is a longitudinally extending lower intermediate notched member comprising sections 29, 30 hinged to each other at 31 and thus adapted to be folded alongside of one another, the notches being indicated at 32.

The sections 14, 19, 29 are provided on their upper faces with laterally extending ears or lugs 33, adapted, when the upper and lower side members and lower intermediate member are straightened out, as in Fig. 2, to engage the upper faces of the sections 14', 20, 30 respectively so as to prevent the upper and lower side members and intermediate lower member from bending downwardly when the rack is in open position.

There are a pair of notches 13 and a notch 32 for each of the frames previously described and when the frames are in place in the rack the projections 12 seat in the notches 13 and the middle portions of the lower members 2 seat in the notches 32 to prevent swinging of the frames longitudinally of the rack.

If desired, the rack may be provided with handles 34 at its opposite ends, said handles in the instance shown being formed by upwardly bent members connected at their opposite ends to the end members 22 and uprights 17 by rivets 35 or the like. The handles 34 may be provided with hooks 36, if desired, so that the rack can be hung on a line, either in open position with the frames in place therein, or in folded position with the frames removed.

To fold the rack, all that is necessary is to detach the upper ends of the braces 26 and buckle upwardly the upper and lower side members and intermediate lower member at their joints and push the ends of the rack toward one another, whereupon the braces 26 at each side will fold alongside of each other and the upper and lower side sections 14, 14', 19, 20 at each side will fold alongside of each other and the sections 29, 30 will fold alongside of each other. Reversing these operations will open the rack for use.

To use the invention, the films, after they have been exposed in a camera or cameras in a manner well understood in the photographic art, will be fastened in place on the frames by the clips 8, there being a clip at each corner for each film so that one film can be fastened at each corner to each frame. After the films have been fastened to the frames, the frames will be inserted in the rack with the projections 12 in the notches 13 and the lower members 2 in the notches 32. After the full complement of the frames, which the rack will hold, or as many less as desired, have been placed in the rack, the rack will be inserted in a tank 5 or other suitable vessel for receiving the usual baths or treatments to which the films are to be subjected, to wit, developing, fixing and washing. A single tank may be used for all of the treatments or processes or the rack may be inserted in different trays, one tank for each treatment.

After the films have been treated by the various baths as above outlined, the rack will be lifted from the tank by the handle 34 and the rack will then be set on a table or other suitable surface to permit the films, now negatives, to dry. In the drying operation a power driven fan may be employed to good purpose, and it is to be noted that the drying by the use of the power driven fan may be effected very conveniently with this invention, since the rack can be changed in position from time to time so as to apply the current of air first to one edge of the negatives and then to the opposite edge, thus changing the direction of the air current through the rack and consequently minimizing the time required for the drying operation.

From the foregoing it is clear that the films need not be touched during any of the treatments to which they are subjected after exposure until ready for the printer and that thus the total time required for the various treatments is minimized as is also the danger of scratching or otherwise injuring the films.

In this connection, it is to be noted, that, after the negatives have been dried in the frames, they may be left in said frames during any retouching operation that may be desirable to perform on the negatives, the retoucher simply laying the frame, after removal from the rack, with the negative attached thereto upon the retouching stand. The retoucher can turn the negative to different positions without it being necessary for him to handle the negative.

The invention is not limited to the exact details of construction shown in the drawings and described above, but the invention also includes such changes and modifications as lie within the spirit and scope of the appended claims.

I claim:

1. A film-treatment cage comprising uprights, notched upper members supported by the uprights, and a notched lower member connected with the uprights, the notches being adapted to engage film-holding frames.

2. A film-treatment cage comprising uprights, means connecting the uprights at each end to each other, foldable notched upper members supported by the uprights, and a foldable notched lower member connected at its ends with the uprights, the notches being adapted to engage film-holding frames.

3. In a film-treatment cage, a rack adapted to be inserted in a tank, the rack being provided with means adapted to co-operate with film-holding frames to detachably and separately suspend the frames in the rack, the rack also being provided with means adapted to co-operate with the frames to prevent swinging of said frames.

Signed at Los Angeles, Cal., this 12th day of July 1919.

AUGUSTUS G. BOXELL.

Witness:
L. BELLE WEAVER.